United States Patent [19]

Hyatt

[11] Patent Number: 5,762,304
[45] Date of Patent: Jun. 9, 1998

[54] BEEPER HOLDER

[76] Inventor: Robert Lee Hyatt, 3040 Cricketeer Dr., Charlotte, N.C. 28216

[21] Appl. No.: 792,662

[22] Filed: Jan. 31, 1997

[51] Int. Cl.$^6$ .................................................. F16M 11/00
[52] U.S. Cl. .................................. 248/176.1; 248/316.7; D3/218
[58] Field of Search ..................... 248/176.1, 309.1, 248/313, 316.1, 316.7; 224/929, 930, 669; D3/218

[56] References Cited

U.S. PATENT DOCUMENTS

| | | | |
|---|---|---|---|
| D. 359,616 | 6/1995 | Ishibashi et al. | D3/218 |
| 4,858,798 | 8/1989 | Siddoway | 224/242 |
| 4,901,852 | 2/1990 | King | 206/320 |
| 4,951,817 | 8/1990 | Barletta et al. | 206/305 |
| 5,385,282 | 1/1995 | Chen | 224/252 |
| 5,452,874 | 9/1995 | Kozloff et al. | 248/222.1 |

*Primary Examiner*—Ramon O. Ramirez
*Attorney, Agent, or Firm*—Evans & Burrell; Susan Borden Evans

[57] ABSTRACT

Disclosed herein is a holder for beepers that can be easily mounted to a stationery item such as a dashboard in a vehicle or a computer workstation. The beeper holder is suitably adapted for an alphanumeric style of beeper with a front or end message display.

17 Claims, 2 Drawing Sheets

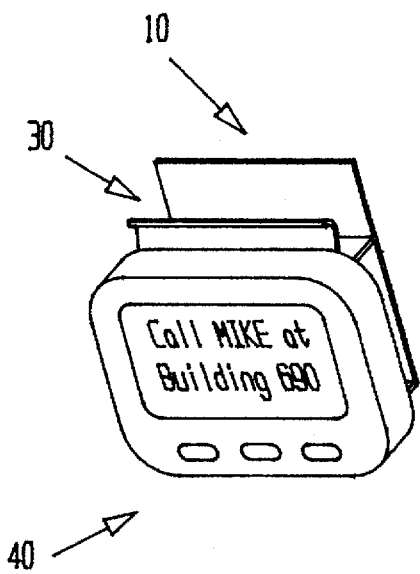
Fig 4 [b]
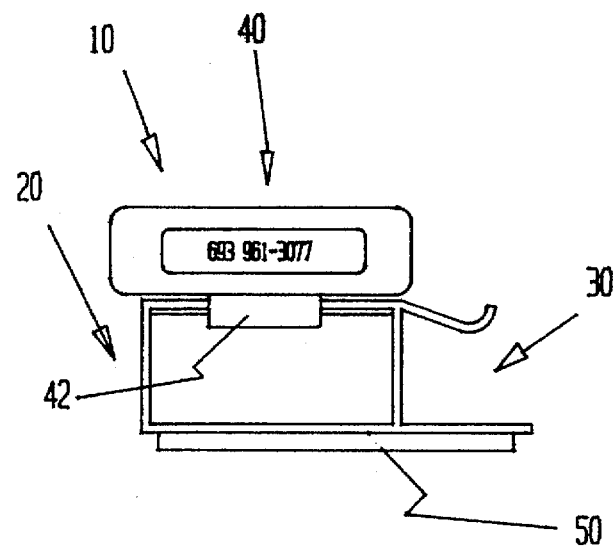
Fig 5
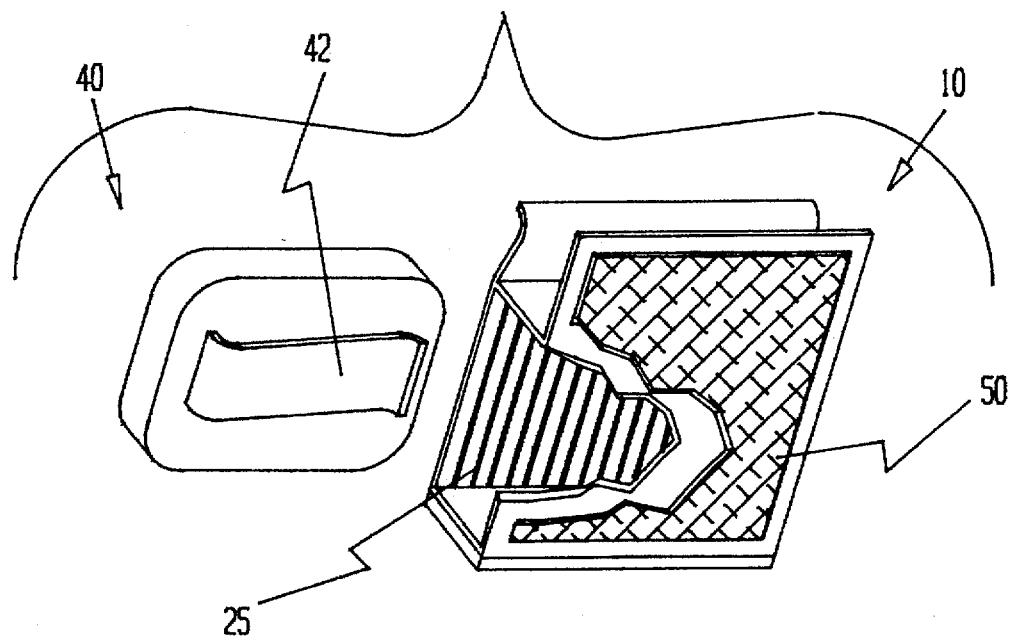
Fig 4 [a]

BEEPER HOLDER

BACKGROUND

The present invention relates to a holder for beepers that can be easily mounted to a stationery item such as a dashboard in a vehicle or a computer workstation.

In today's society portable beepers are common place in every aspect of society. There is a continuing rush to update and advance the proliferating technology and design of the beeper. The present invention is designed to accommodate both older clip beepers as well as newer alphanumeric style beepers. The newer alphanumeric beepers are often read from the front face rather than the ends and are often times designed without a clip. The present invention easily accommodates beepers with front or side/end message display and with or without clips. The present invention is convenient for use in the office, home or car. The beeper holder of this invention is small in size and easy to mount to almost any surface.

A retaining device for electronic signaling devices (ie. beeper holder) is known in the art. However, it is designed for a beeper that has a clip apparatus and an end view. See U.S. Pat. No. 5,452,874 (Kozloff et al.)

This prior art does not disclose the instant invention.

SUMMARY OF THE INVENTION

The present invention provides a beeper holder for mounting a portable electronic paging device or beeper on a stationery surface, said beeper holder comprising:

a) a base member with front, back, top and bottom walls, each wall having interior and exterior surfaces, said front and back walls spaced apart a distance substantially equal to the width of a beeper;

b) a holder member having a bottom wall the under side of which is the exterior of the top wall of the base member;

c) a pair of spaced apart upstanding side walls extending upwardly from the opposite edges of the bottom wall of the holder member consisting of a rear wall and a forward clip wall moveable between a retaining position and a released position, said side walls spaced apart a distance substantially equal to the width of the beeper.

The present invention also has an attachment means for affixing the bottom wall or back wall of the base member to a stationery surface.

The present invention provides a beeper holder for beepers having a front or side/end message display and with or without a clip device.

BRIEF DESCRIPTION OF THE DRAWINGS

These as well as other features of the present invention will become more apparent upon reference to the drawings wherein:

FIG. 4(a) is a front perspective view of the beeper holder with a clip beeper partially inserted therein.

FIG. 4(b) is a front perspective view of the beeper holder with a clip beeper having a front message display completely inserted therein, wherein the beeper holder is obscured from view by the clip beeper.

FIG. 5 is a side view of the beeper holder in a horizontal position and inserted therein a clip beeper having a side/end message display.

DETAILED DESCRIPTION OF THE INVENTION

Figure 3:
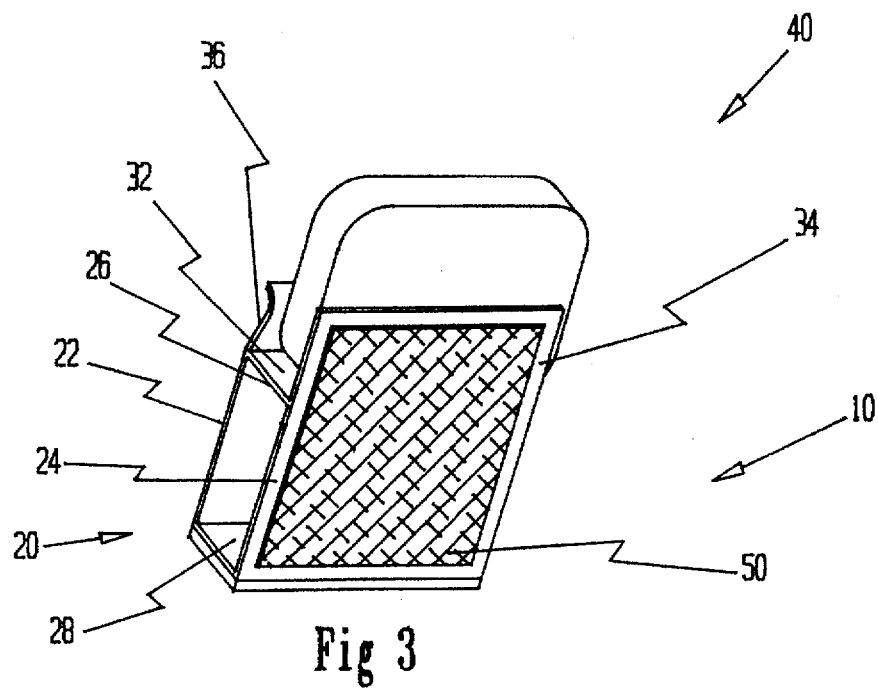
FIG. 3 is a side perspective view of the beeper holder with beeper in place.

Referring to the drawings, FIGS. 1–5 illustrate a holder device for mounting a portable electronic paging device (ie. beeper holder) referred to by the general reference character 10.

Figures 1, 2:
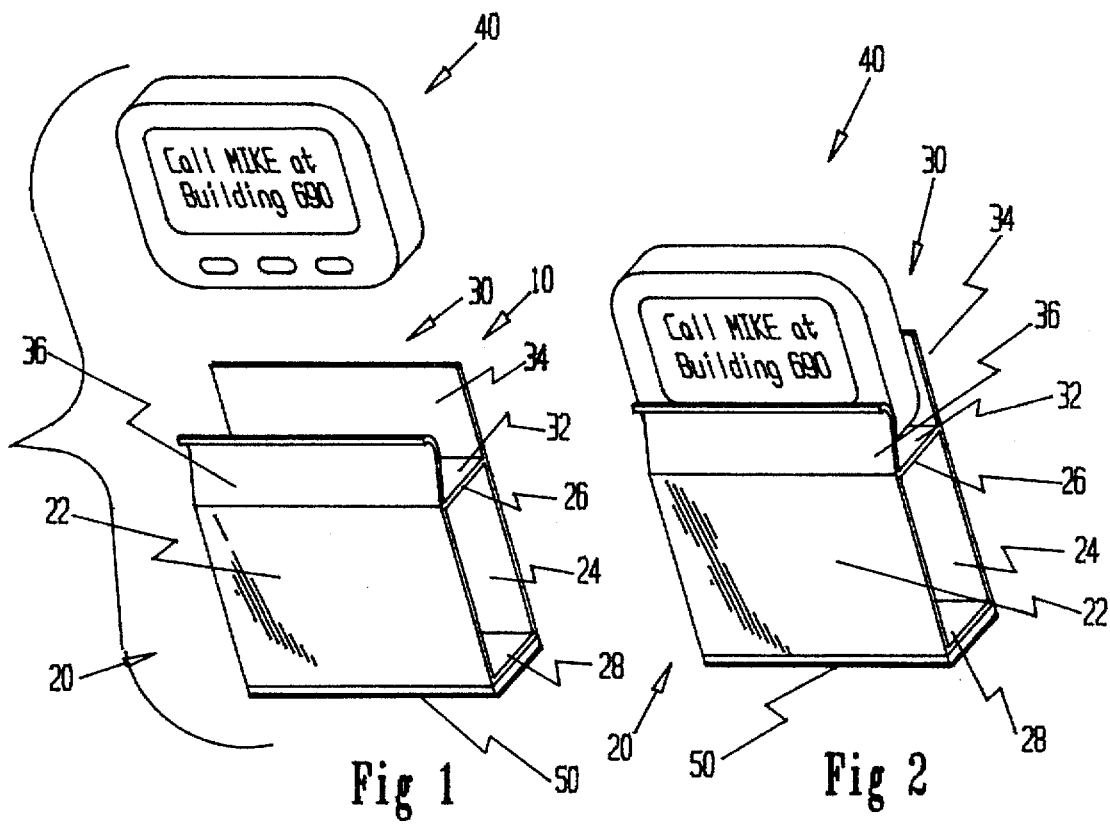
FIG. 1 is a front perspective view of the beeper holder.
FIG. 2 is a front perspective view of the beeper holder with beeper in place said beeper having a front message display.

FIGS. 1, 2, and 3 illustrate the beeper holder of the present invention generally. The beeper holder 10 has a base member 20, a holder member 30 and an attachment means 50.

The base member 20 has a front wall 22, a back wall 24, a top wall 26 and a bottom wall 28, each wall having interior and exterior surfaces, said front wall 22 and back wall 24 are spaced apart a distance substantially equal to the width of a beeper.

The holder member 30 has a bottom wall 32 the under side of which is (or is attached to) the exterior of the top wall 26 of the base member 20, and a pair of spaced apart upstanding side walls(a rear wall 34 and a forward clip wall 36 moveable between a retaining position and a released position) extending upwardly from the opposite edges of the bottom wall 32 of the holder member 30, said side walls 34,36 are spaced apart a distance substantially equal to the width of a beeper 40. The side walls 34, 36 of the holder member 30 are a suitable height to both securely hold a beeper 40 and permit a clear view of a message display of the beeper 40. Preferably, the rear side wall 34 of the holder member is taller than the forward clip wall 36 of the holder member 30. The forward clip wall 36 moves between a retaining position and a released position allowing for the insertion of a beeper 40 and snugly holds said beeper 40 in place.

The attachment means 50 may be attached to the exterior of the bottom wall 28 of the base member 20 as illustrated in FIGS. 1 and 2. The attachment means 50 may also attach to the rear of the back wall 24 of the base member 20 as illustrated in FIGS. 3 and 5. Any suitable attachment means may be used, preferably double sided adhesive pads.

FIG. 1 further illustrates a plurality of ridges 25 situated on the interior surface of the front wall 22 of the base member 20 of the beeper holder 10. Said ridges 25 are spaced apart a distance effective to receive a beeper clip 42 (also referred to herein as a clip) having corresponding ridges.

Beepers 40 often have clips 42 which are generally mounted on the back thereof. The clip 42 has a plurality of ridges which substantially correspond to those on the interior surface of the front wall 22 of the base member 20 of the beeper holder 10. When the beeper 40 is clipped into place in the beeper holder 10 the interlocking of the ridges from the beeper holder 10 and the beeper 40 holds the beeper 40 in place.

FIG. 4 illustrates a clip beeper 40 (a beeper with a clip device attached thereto) with a front message display. FIG. 4(a) illustrates the beeper holder 10 with a clip 42 partially inserted therein. FIG. 4(b) illustrates a clip beeper 40 that has been completely inserted into the beeper holder 10 thereby obscuring the beeper holder 10 from view in a frontal perspective.

FIG. 5 illustrates a side/end message display beeper 40 which has been inserted into the beeper holder 10. The terms side message display and end message display are used interchangeably throughout this application. The beeper holder 10 is positioned in a horizontal orientation and has the attachment means 50 on the exterior of the back wall 24 of the base member 20.

The beeper holder 10 of the present invention is versatile and can easily be used in the office, home or car/truck. In the office it can be placed on a desk or computer top, in a car or truck on a dash board or console, and in the home it can be placed on a nightstand or TV stand. The beeper holder 10 is small and inexpensive thus allowing the owner to purchase a beeper holder 10 for each desired location.

Changes and modifications in the specifically described embodiments can be carried out without departing from the scope of the invention which is intended to be limited only by the scope of the appended claims.

What is claimed is:

1. A beeper holder for mounting a portable electronic paging device or beeper on a stationery surface, said beeper holder comprising:
    a) a base member with front, back, top and bottom walls each wall having interior and exterior surfaces, said front and back walls spaced apart a distance substantially equal to the width of a beeper;
    b) a holder member having a bottom wall the under side of which is the exterior of the top wall of the base member; and
    c) a pair of spaced apart upstanding side walls extending upwardly from the opposite edges of the bottom wall of the holder member consisting of a rear wall and a forward clip wall moveable between a retaining position and a released position, said side walls spaced apart a distance substantially equal to the width of the beeper.

2. A beeper holder according to claim 1 wherein a plurality of ridges are situated on the interior surface of the front wall of the base member said ridges spaced apart a distance effective to receive a beeper clip having corresponding ridges.

3. A beeper holder according to claim 1 wherein the exterior of the bottom wall of the base member has an attachment means.

4. A beeper holder according to claim 2 wherein the exterior of the back wall of the base member has an attachment means.

5. A beeper holder according to claim 3 wherein the attachment means is a two sided adhesive pad.

6. A beeper holder according to claim 4 wherein the attachment means is a two sided adhesive pad.

7. A beeper holder according to claim 3 wherein the side walls of the holder member are a suitable height to both securely hold a beeper and permit a clear view of a message display of the beeper.

8. A beeper holder according to claim 7 wherein the beeper is positioned in a vehicle.

9. A beeper holder in combination with a beeper having a front and back face and a pair of ends with a display on one of the faces or one of the ends, said beeper holder comprising:
    a) a base member with front, back, top and bottom walls, each wall having interior and exterior surfaces, said front and back walls spaced apart a distance substantially equal to the width of a beeper;
    b) a holder member having a bottom wall the under side of which is the exterior of the top wall of the base member;
    c) a pair of spaced apart upstanding side walls extending upwardly from the opposite edges of the bottom wall of the holder member having a wall and a forward clip wall moveable between a retaining position and a released position, said side walls spaced apart a distance substantially equal to the width of the beeper; and
    d) an attachment means for affixing the base member to a stationery surface.

10. A beeper holder in combination with a beeper according to claim 9 wherein the beeper holder device is suitably positioned in a vehicle.

11. A beeper holder in combination with a beeper according to claim 10 wherein the beeper has an end message display.

12. A beeper holder in combination with a beeper according to claim 10 wherein the beeper has a front message display.

13. A beeper holder in combination with a beeper according to claim 9 wherein the beeper is situated with a clip.

14. A beeper holder in combination with a beeper according to claim 13 wherein said beeper holder is situated with a plurality of ridges on the interior surface of the front wall of the base member said ridges spaced apart a distance effective to receive a beeper clip having corresponding ridges.

15. A beeper holder in combination with a beeper according to claim 13 wherein the beeper holder device is suitably positioned in a vehicle.

16. A beeper holder in combination with a beeper according to claim 15 wherein the beeper has an end message display.

17. A beeper holder in combination with a beeper according to claim 15 wherein the beeper has a front message display.

* * * * *